United States Patent [19]
Feisullin et al.

[11] Patent Number: 5,828,946
[45] Date of Patent: Oct. 27, 1998

[54] CATV-BASED WIRELESS COMMUNICATIONS SCHEME

[75] Inventors: Farid Feisullin, Chatham; George P. Vella-Coleiro, Summit, both of N.J.

[73] Assignee: Lucent Technologies Inc., Murray Hill, N.J.

[21] Appl. No.: 755,508

[22] Filed: Nov. 22, 1996

[51] Int. Cl.[6] .................................................. H04N 7/173
[52] U.S. Cl. ............................................. 455/5.1; 348/12
[58] Field of Search .............................. 348/6, 7, 12, 13, 348/14, 15, 16, 17, 18, 19; 455/3.1, 4.1, 4.2, 5.1, 6.1, 6.2, 6.3, 403, 422; 379/56.1, 56.2; H04N 7/16, 7/173

[56] References Cited

U.S. PATENT DOCUMENTS

| | | | |
|---|---|---|---|
| 3,835,393 | 9/1974 | Marron | 455/5.1 |
| 3,886,454 | 5/1975 | Oakley et al. | 455/4.2 |
| 5,126,840 | 6/1992 | Dufresne et al. | 358/86 |
| 5,381,459 | 1/1995 | Lappington | 379/56 |
| 5,627,879 | 5/1997 | Russell et al. | 455/422 |
| 5,638,422 | 6/1997 | Roman | 348/14 |
| 5,657,374 | 8/1997 | Russell et al. | 455/422 |

OTHER PUBLICATIONS

"Cable Pursues Wireless", by Arthur Cole, editor of Video Technology News, a Phillips Telecom Group Publication, Jun. 1996, 5 pages.

"Interpolation, Extrapolation, and Reduction of Computation Speed in Digital Filtres", by Maurice G. Bellanger et al., IEEE Transactions on Acoustics, Speech, and Signal Processing, vol. ASSP–22, No. 4, Aug. 1974, pp. 231–235.

"A Class of Infinite–Duration Impulse Response Digital Filters for Sampling Rate Reduction", by Horacio G. Martinez et al., IEEE Transactions on Acoustics, Speech, and Signal Processing, vol. ASSP–27, No. 2, Apr. 1979, pp. 154–162.

"Some Comparisons Between FIR and IIR Digital Filters" by L.R. Rabiner et al., Copyright 1974 American Telephone can Telegraph Company, The Bell System Technical Journal, vol. 53, No. 2, Feb. 1974, pp. 305–331.

"On the Design and Performance of Efficient and Novel Filter Structures Using Recursive Allpass Filters", ISSPA 92, Signal Processing and its Applications, Gold Cost, Australia, Aug. 16–21, 1992, Editor, D. Gray, pp. 1–5.

"Design of Doubly–Complementary IIR Digital Filters Using a Single Complex Allpass Filter, With Multirate Applications", by P.P. Vaidyanathan et al., IEEE Transactions on Circuits and Systems, vol. CAS–34, No. 4, Apr. 1987, pp. 378–389.

"Design of Digital All–Pass Filtres Using a Weighted Least Squares Approach", by Charng–Kann Chen and Ju–Hong Lee, IEEE transactions on Circuits and Systems—II: Analog and Digital Signal Processing, vol. 41, No. 5, May 1994, pp.346–351.

"Simple and Robust Method for the Design of Allpass Filters Using Least–Squares Phase Error Criterion", by Markus Lang and Timo I Laako, IEEE Transactions on Circuits and Systems–II: Analog and Digital Signal Processing, vol. 41, No. 1, Jan. 1994, pp. 40–48.

"A Computer Program for Designing Optimum FIR Linear Phase Digital Filters", James H. McClellan et al., IEEE Transactions on Audio and Electroacoustics, vol. AU–21, No. 6, Dec. 1973, pp. 506–526.

*Primary Examiner*—Chris Grant

[57] ABSTRACT

Radio frequency (RF) mobile telephone communications signals are converted to cable television (CATV) frequencies for transmission over existing CATV infrastructure. In the upstream path (i.e., from one or more mobile telephones to a base station), multiple receivers (called remote converters) receive and convert RF signals to cable signals. The cable signals from different receivers are combined by a remote cable node and transmitted over tie cable network to tie base station. In order to reduce noise in the combined cable signal, only those remote converters that receive RF signals of sufficient power level will contribute cable signals to the combined signal. This scheme enables the communications network to be configured with a greater number of relatively inexpensive, low-power remote converters for each remote cable node while still maintaining signal integrity.

12 Claims, 3 Drawing Sheets

CATV-BASED WIRELESS COMMUNICATIONS SCHEME

BACKGROUND OF THE INVENTION

1. Field of the Invention

The present invention relates to wireless communications, such as mobile telephone communications.

2. Description of the Related Art

Proposals have been made to use existing cable television (CATV) infrastructure as part of networks for mobile telephone communications. According to one proposal, mobile telephone signals in the personal communication service (PCS) frequency ranges would be converted to frequencies corresponding to CATV signals for transmission over standard cable television lines. Under this proposal, the mobile telephone signals would be encoded using code division multiple access (CDMA) modulation. Over different parts of the network, these CDMA signals would be transmitted either as radio frequency (RF) signals through the air or as CATV signals over cable wires. See, e.g., Arthur Cole, "Cable Pursues Wireless." Wireless Business and Technology, June 1996.

Referring now to FIG. 1, there is shown a block diagram of such a proposed network comprising one or more conventional CDMA base stations 102, one or more base station converters 104 for each base station, one or more remote cable nodes 106 (e.g., fiber optic cable nodes) for each base station converter, and one or more remote converters 108 for each remote cable node. Under one proposed scheme, conventional mobile telephones (not shown in FIG. 1) transmit RF signals through the air in the PCS upstream 1850–1910 MHz frequency range. These RF signals are received at one or more remote converters 108, where they are converted to a cable upstream 5–42 MHz frequency range for transmission as cable signals over cable line 110 to remote cable node 106. Remote cable node 106 passes the cable signals from the different remote converters 108 for transmission as a combined cable signal over conventional cable network 112 to base station converter 104. Base station converter 104 converts the cable signals back to the PCS upstream 1850–1910 MHz frequency range for transmission as RF signals to CDMA base station 102.

CDMA base station 102 performs conversion, filtering, routing, and other conventional mobile telecommunications processing on the received RF signals. For the United States market, base station converter 104 converts the RF signals to a cable downstream 54–750 MHz frequency range for transmission as cable signals over cable network 112 to remote cable node 106. Remote cable node 106 transmits the cable signals to the various remote converters 108. Each remote converter 108 converts the cable signals back to the PCS downstream 1930–1990 MHz frequency range for transmission as RF signals to the various remote telephone units.

Under this proposal, within the upstream path (e.g., from the mobile/wireless telephones to a CDMA base station), each remote converter 108 contributes some noise to the cable telephone signal transmitted via a remote cable node 106 to base station converter 104. Such noise in the cable signal will limit the capacity of the system. As more noise is contributed to the combined cable signal, the capacity will continue to decrease. One goal of the present invention is to reduce the level of noise in the combined cable signal in order to preserve the system capacity.

Further objects and advantages of this invention will become apparent from the detailed description which follows.

SUMMARY OF THE INVENTION

The present invention is directed to communications methods and apparatuses. In one embodiment, communications signals corresponding to a mobile frequency range are received from one or more mobile units. Each of the communications signals is characterized and, for each communications signal, the communications signal are converted from the mobile frequency range to a cable frequency range and the converted signal is combined with any other converted signals, only if the characterization of the communications signal satisfies specified conditions. The combined signals are transmitted over a cable network.

Another embodiment of the present invention is a remote converter for processing communications signals. A mobile-to-cable converter is adapted to receive, from one or more mobile units, upstream mobile signals in an upstream mobile frequency range, convert the upstream mobile signals into upstream cable signals in an upstream cable frequency range, and transmit the upstream cable signals to a cable network. A signal level monitor is adapted to determine a signal level corresponding to the upstream mobile signals. A switch is adapted to inhibit transmission of the upstream cable signals to the cable network, if the upstream signal level is not sufficiently strong.

Yet another embodiment of the present invention is a communications network comprising a base station converter, one or more remote cable nodes, and one or more remote converters for each remote cable node. Each remote converter is adapted to receive, from one or more mobile units, upstream mobile signals in an upstream mobile frequency range, convert the upstream mobile signals into upstream cable signals in an upstream cable frequency range, and transmit the upstream cable signals to the corresponding remote cable node only if a signal level corresponding to the upstream mobile signals is sufficiently high. Each remote cable node is adapted to combine the upstream cable signals received from the corresponding remote converters and transmit an upstream combined cable signal to the base station converter. The base station converter is adapted to convert the upstream combined cable signal into an upstream RF signal in the upstream mobile frequency range for transmission to a base station.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

Figure 1:
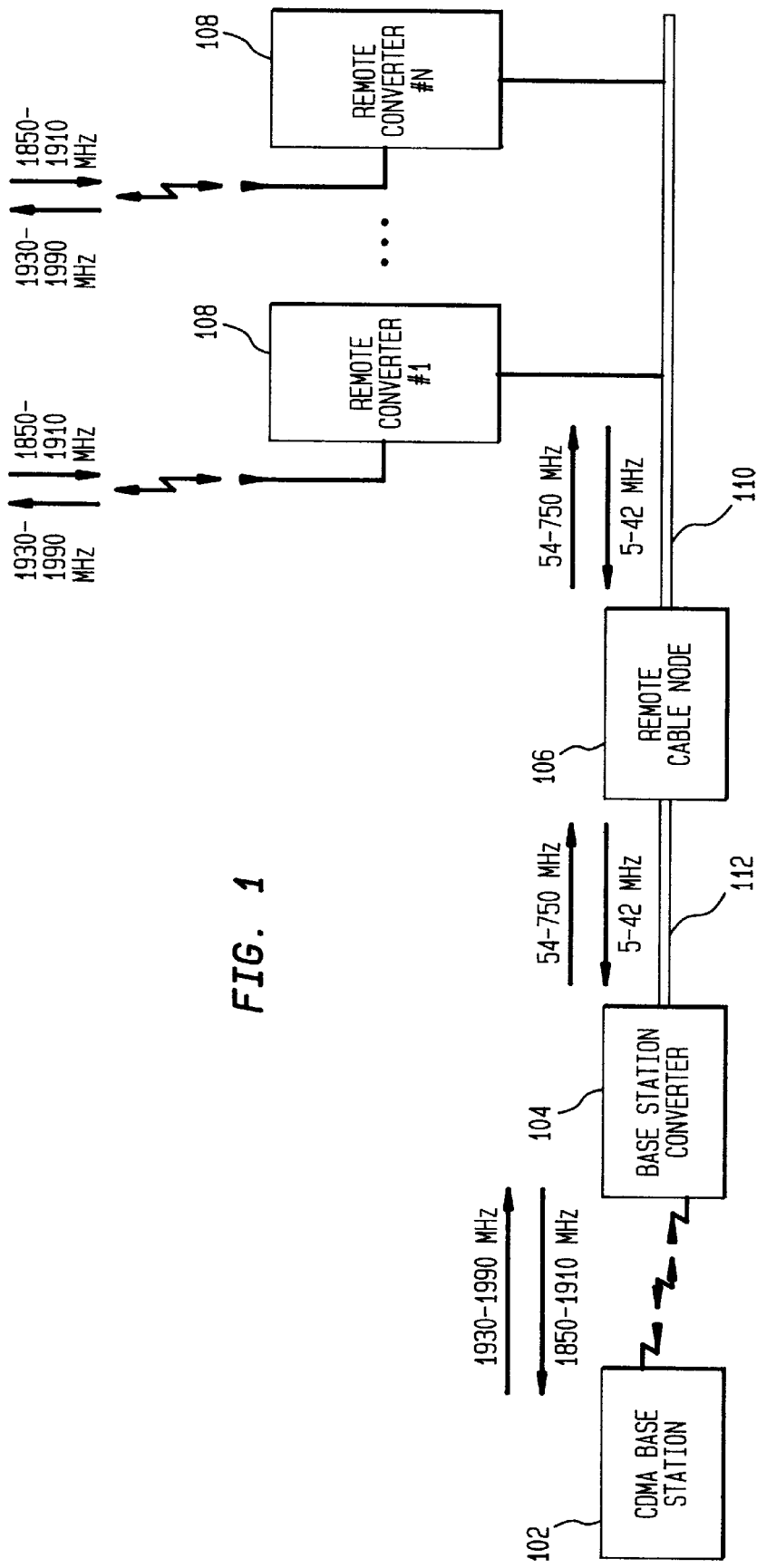
FIG. 1 is a block diagram of a proposed communications network that uses existing cable television infrastructure for mobile telephone communications.

In the proposed communications network of FIG. 1, each remote cable node 106 is configured with one or more remote converters. The number and location of the remote converters depends on the particular environment in which the network is to be implemented. Take, for example, a typical suburban neighborhood already wired for cable television service. A given remote cable node 106 may service in many different buildings with a single CATV line running from a remote cable node 106 to each building.

In order to configure the CATV network to support mobile telephone communications, several remote converters can be deployed in multiple locations so as to provide coverage over the desired area and the remote converters are designed to be able to transmit Rf signals with sufficient power level to reach a mobile telephone unit located anywhere within the desired area, including inside of buildings. This can result in bulky and expensive remote converters for such a network which are difficult to deploy and maintain.

Another option is to distribute multiple remote converters within each building (e.g., one or more on each floor). This option reduces the distance and number of walls needed to be penetrated by the RF signals from each remote converter, thus ensuring mobile access or coverage throughout the building. As Such, each remote converter can be designed to operate at a lower power level. This can reduce the cost of configuring each building with remote converters, as compared with the single, high-power remote converter solution. Unfortunately, for the latter scheme, the number of remote converters that are transmitting cable signals to remote cable node 106 is extremely limited.

Under the conventional scheme of FIG. 1, each remote converter continuously transmits cable signals to remote cable node 106 for inclusion in the combined cable signal transmitted to base station converter 104. This is true whether or not the remote converter is actually receiving RF signals from a wireless subscriber telephone un it. Every cable signal transmitted to remote cable node 106 contributes noise to the combined cable signal. As a result, there is an effective limit (e.g., 4–8) to the number of remote converters that can be connected to a remote cable node 106 at any one time.

According to the present invention, the remote converters are designed to transmit cable signals to remote cable node 106 only if they are actually receiving a significant amount of RF signals from a one or more wireless subscriber units. If they are not currently receiving a sufficient level of the RF signals, then the invention will not transmit cable signals to remote cable (upstream) node 106. As a result, the network can be configured such that each remote cable node 106 has associated with it an increased number of remote converters. This enables the network to be configured with multiple low-power remote converters located within each building and more than one building with each remote cable node 106. Under normal operating conditions, only a subset of the total number of remote converters for each remote cable node 106 will be receiving RF signals of sufficient power level to warrant transmission of a cable signal from the remote converter to remote cable node 106. The rest of the remote converters will not be receiving such RF signals and will therefore not be transmitting cable signals upstream to the cable node 106. As a result, these inactive remote converters will not be contributing unwanted noise to the combined cable signal transmitted from remote cable node 106 to base station converter 104.

This scheme has additional advantages, such as a higher capacity since the noise level within the building is generally lower than that encountered by the higher-power outdoor-deployed remote converters. A lower ambient noise operating environment for the wireless subscriber units will allow the units to transmit at lower power levels and thus increase the talk time by reducing the current drawn from each subscriber unit's battery.

Figure 2:
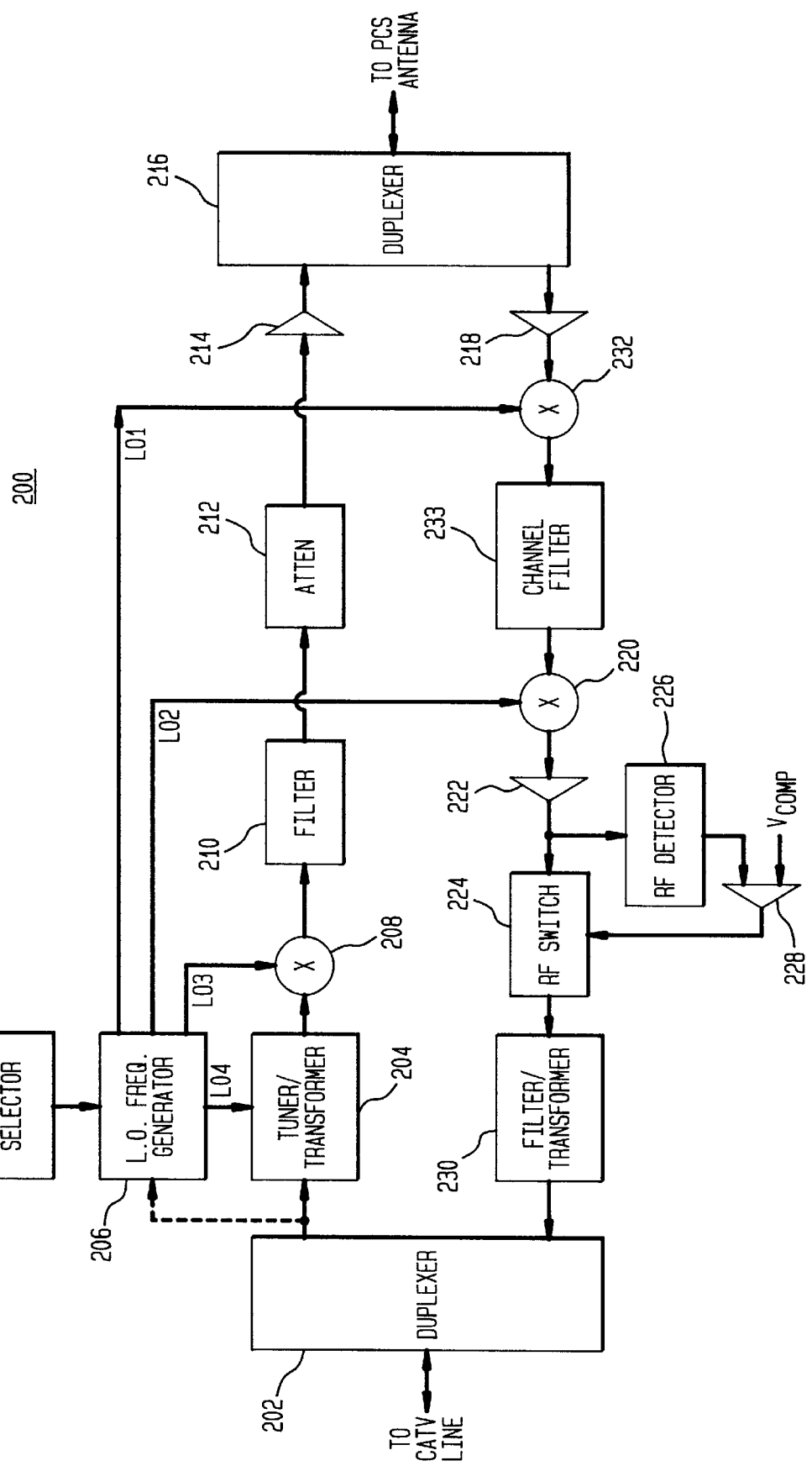
FIG. 2 is a block diagram of a remote converter for use in the communications network of FIG. 1, according to one embodiment of the present invention.

Referring now to FIG. 2, there is shown a block diagram of remote converter 200 for use in the communications network of FIG. 1, according to one embodiment of the present invention. Remote converter 200 has a downstream path, in which cable signals received from a remote cable node, Such as remote cable node 106 of FIG. 1, are converted into RF signals for transmission to one or more wireless subscriber units. Remote converter 200 also has an upstream path, in which RF signals received from the one or more remote telephone units are converted into cable signals for transmission to the remote cable node. According to the present invention, in the upstream path, cable signals are transmitted from remote converter 200 to the remote cable node, only if the RF signals received from the mobile telephone units are of a sufficient signal (i.e., power) level.

In one implementation, remote converter 200 is designed to process signals in the following PCS and CATV frequency ranges:

1850–1910 MHz: RF signals received from mobile telephone units (PCS upstream signals);

1930–1990 MHz: RF signals transmitted to mobile telephone units (PCS downstream signals);

5–42 MHz: Cable signals transmitted to cable TV network (cable upstream signals); and 54–750 MHz: Cable signals received from cable TV network (cable downstream signals).

In particular, for the downstream path, duplexer 202 of FIG. 2 receives cable signals from the cable TV network (e.g., from remote cable node 106) and transmits the signals to tuner/transformer 204, which selects the signals corresponding to the particular cable TV channel designated to carry the telephone signals and converts the selected signals to a fixed intermediate frequency (IF) by mixing the cable signal with local oscillator (L.O.) frequency LO4. Tuner/transformer 204 also has a 75 db to 50 db impedance transformer. The TV channel selected by tuner/transformer 204 is determined by the frequency of the local oscillator frequency L04 received by tuner 204 from frequency generator 206. Frequency generator 206 either has its own reference frequency or obtains a reference frequency from the downstream cable signal, as shown by the dashed line connecting duplexer 202 to frequency generator 206 in FIG. 2. Frequency generator 206 is controlled by channel selector 231.

Mixer 208 combines the fixed IF signal received from tuner/transformer 204 with signal LO3 generated by frequency generator 206. Mixer 208 converts the IF frequency output of tuner/transformer 204 to the PCS downstream 1930–1990 MHz frequency range. Mixer 208 generates both the sum and difference between the signal LO3 and the IF signal. Filter 210 selects the signals corresponding to either the sum or difference and passes the selected signals to attenuator 212 and amplifier 214, which adjust and amplify the signals for transmission. Duplexer 216 forwards the signals for RF transmission to the wireless telephone units via the PCS antenna.

For the upstream path, duplexer 216 receives RF signals from one or more wireless telephone units. Amplifier 218 amplifies the RF signals. Mixer 232 combines the amplified RF signals with the signal LO1 from frequency generator 206 to convert the RF signals from the PCS upstream 1850–1910 MHz frequency range to a fixed intermediate frequency (e.g., 140 MHz) suitable for filtering by channel filter 233. Mixer 220 combines the intermediate frequency signal with signal LO2 from frequency generator 206 to produce sum and difference frequencies, the difference frequency being the cable signal to be sent to the remote cable node.

The cable signals are amplified by amplifier 222 and transmitted to both RF switch 224 and RF detector 226. RF detector 226 generates an output signal representative of the signal level of the cable signals received from amplifier 222. This output signal is compared to a specified threshold voltage level $V_{COMP}$ by comparator 228. If the output signal from detector 226 is greater than the threshold voltage level, then comparator 228 generates an output signal that causes RF switch 224 to pass the cable signals received from amplifier 222 on to filter/transformer 230. Otherwise, comparator 228 generates an output signal that causes RF switch 224 to inhibit the transmission of the cable signals to filter/transformer 230. Filter/transformer 230 selects the difference signals generated by mixer 220 for transmission by duplexer 202 to the cable network (e.g., to remote cable node 106). Filter/transformer 230 also has a 50 db to 75 db impedance transformer.

By monitoring the signals in the upstream path, remote converter 200 ensures that cable signals will be transmitted to the cable network, only if they satisfy certain conditions (e.g., a wireless telephone subscriber's signal level is present and of sufficient magnitude). Those conditions will be met only if a remote telephone unit is transmitting RF signals within the proximity of that remote converter 200. If that is not the case, then the signal level of the received RF signals will be small and no cable signals will be transmitted to remote cable node 106. As such, no noise will be contributed by that remote converter 200 to the combined cable signal transmitted from remote cable node 106 to base station converter 104.

Figure 3:
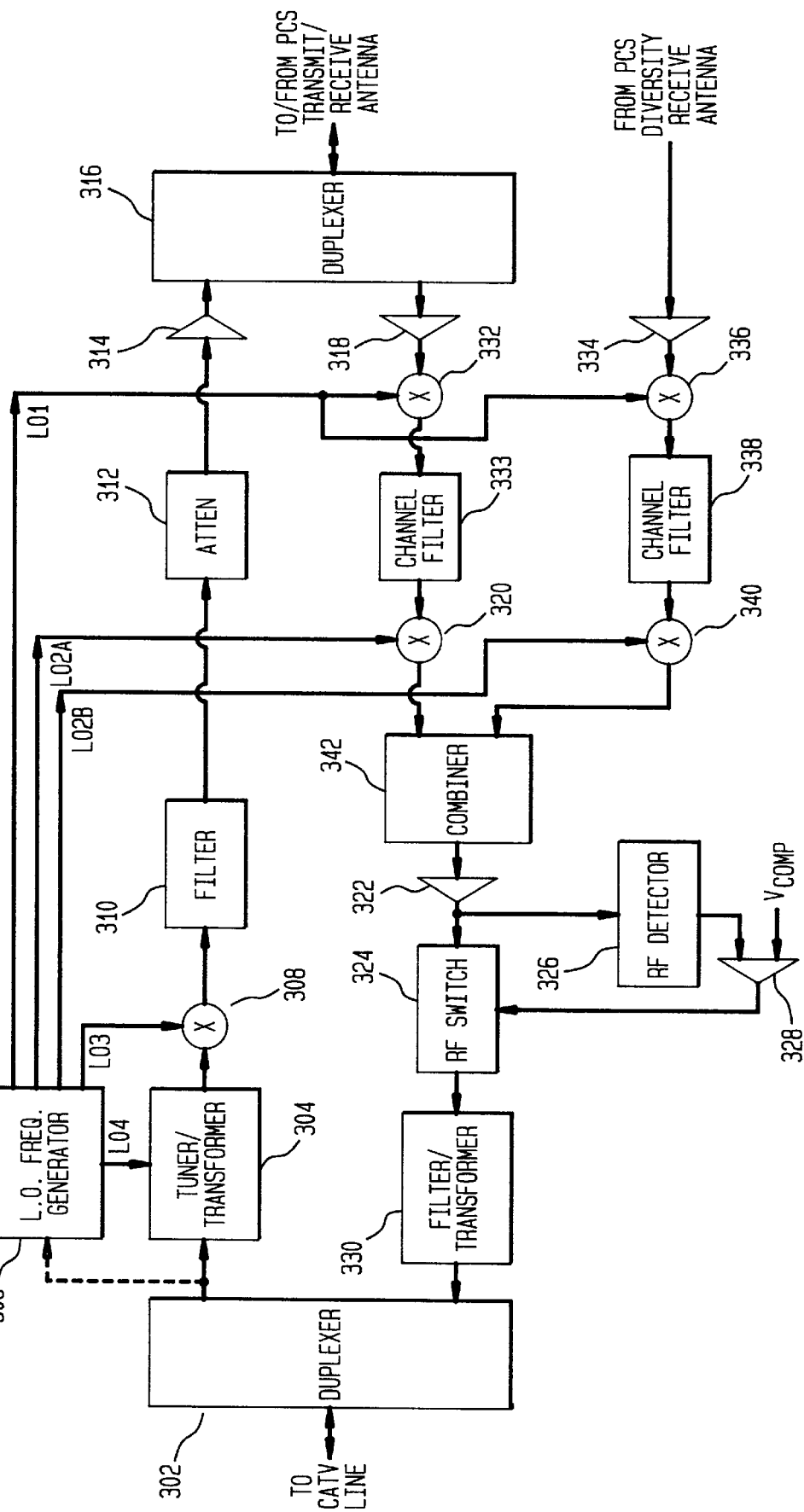
FIG. 3 is a block diagram of a remote converter for use in the communications network of FIG. 1, according to another embodiment of the present invention.

Referring now to FIG. 3, there is shown a block diagram of remote converter 300 for use in the communications network of FIG. 1, according to another embodiment of the present invention. Unlike remote converter 200 of FIG. 2, remote converter 300 has receive diversity. In addition to having transmit and receive paths that are analogous to those of remote converter 200, remote converter 300 has an additional path for a receive antenna. The additional path adds about three db of processing gain to the device, thereby resulting in a better voice quality and extended mobile unit battery time due to a corresponding lower average wireless subscriber transmit power requirement.

In particular, remote converter 300 has a downstream path, in which cable signals received from a remote cable node, such as remote cable node 106 of FIG. 1, are converted into RF signals for transmission to one or more wireless subscriber units. Remote converter 300 also has two upstream paths, in which RF signals received from the one or more remote telephone units are converted into cable signals for transmission to the remote cable node. According to the present invention, in the upstream paths, cable signals are transmitted from remote converter 300 to the remote cable node, only if the RF signals received from the mobile telephone units are of a sufficient signal (i.e., power) level.

Elements 302–333 of FIG. 3 function analogous to elements 202–233 of FIG. 2, respectively. For the additional upstream path, amplifier 334 of remote converter 300 amplifies RF signals received by a PCS diversity receive antenna (not shown in FIG. 3) from one or more wireless telephone units. Mixer 336 combines the amplified RF signals with the signal LO1 from frequency generator 306 to convert the RF signals from the PICS upstream 1850–1910 MHz frequency range to a fixed intermediate frequency (e.g., 140 MHz) suitable for filtering by channel filter 338. Mixer 340 combines the intermediate frequency signal with signal LO2B from frequency generator 306 to produce sum and difference frequencies, the difference frequency being the cable signal to be sent to the remote cable node.

Combiner 342 combines the cable signals generated by mixer 320 and mixer 340 for both uplink paths. The combined cable signals are then amplified by amplifier 322 and transmitted to both RF switch 324 and RF detector 326. RF detector 326 generates an output signal representative of the signal level of the combined cable signals received from amplifier 322. This output signal is compared to a specified threshold voltage level $V_{COMP}$ by comparator 328. If the Output signal from detector 326 is greater than the threshold voltage level, then comparator 328 generates an Output signal that causes RF switch 324 to pass the cable signals received from amplifier 322 on to filter/transformer 330. Otherwise, comparator 328 generates an output signal that causes RF switch 324 to inhibit the transmission of the cable signals to filter/transformer 330. Filter/transformer 330 selects the difference signals generated by mixers 320 and 340 for transmission by duplexer 302 to the cable network (e.g., to remote cable node 106). Filter/transformer 330 also has a 50 db to 75 db impedance transformer.

By monitoring the combined signals in the upstream paths, remote converter 300 ensures that cable signals will be transmitted to the cable network, only if they satisfy certain conditions (e.g., a wireless telephone subscriber's signal level is present and of sufficient magnitude). Those conditions will be met only if a remote telephone unit is transmitting RF signals within the proximity of that remote converter 300. If that is not the case, then the signal level of the received RF signals will be small and no cable signals will be transmitted to remote cable node 106. As such, no noise will be contributed by that remote converter 300 to the combined cable signal transmitted from remote cable node 106 to base station converter 104.

Using remote converters in accordance with the present invention, such as remote converter 200 of FIG. 2 or remote converter 300 of FIG. 3, in the communications network of FIG. 1 enables the configuration of many more remote converters with each remote cable node 106 than would otherwise be possible without corruption of the cable signals with noise. In fact, because only remote converters that are actually receiving RF signals of sufficient signal level will be transmitting cable signals to the remote cable node and because such cable signals will have relatively good signal-to-noise ratios, the possibility exists that a communications network in accordance with the present invention could support a greater number of active (i.e., transmitting in the upstream direction) remote converters at any given time without corrupting the cable signals. This is attributed to the lower noise levels due to the shielding effects of walls and other structural elements.

Those skilled in the art will understand that the present invention may be implemented in environments and embodiments different from those shown in FIGS. 1–3. For example, a remote converter according to an alternative embodiment of the present invention could have filter 230 of FIG. 2 before RF switch 224 in the upstream path. In addition, the present invention could be implemented to process signals in frequency ranges different from the PCS and cable frequency bands described above.

In remote converter 200 of FIG. 2 and remote converter 300 of FIG. 3, a signal level corresponding to the received RI: signals is compared to a specified threshold level to determine whether the remote converter will transmit cable signals in the upstream path. In alternative embodiments, other criteria may be applied to make that determination. For example, the threshold level may be a dynamic threshold level that varies over time. Alternatively, the received signals could be processed to determine whether the signal-tonoise ratio was sufficiently great. In another embodiment, the received signals could be processed to determine whether they contain a specified code before allowing cable signals to be transmitted.

In the above descriptions, the one or more units to which remote converter 200 or 300 transmits RF signals and from which it receives RF signals are described as mobile (i.e., wireless) telephones. It will be understood that these units could be other communication devices, such as stationary telephones or other sources of communications signals such as fax machines or computers.

Furthermore, instead of using duplexer 216 in FIG. 2 and duplexer 316 in FIG. 3, In some instances it might be advantageous to use separate transmit and receive antennas.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A communications method, comprising the steps of:
   (a) receiving communications signals corresponding to any frequency in a wideband mobile frequency range from one or more mobile units;
   (b) converting each communications signal to an intermediate frequency (IF) to generate an IF signal;
   (c) filtering each IF signal;
   (d) converting each filtered IF signal to any frequency in a wideband cable frequency range to generate a cable signal;
   (e) characterizing each cable signal;
   (f) for each cable signal, combining the cable signal with any other cable signals, only if the characterization of the cable signal satisfies specified conditions; and
   (g) transmitting the combined signals over a cable network.

2. The invention of claim 1, wherein the wideband mobile frequency range is between approximately 1850 MHz and approximately 1910 MHz and the wideband cable frequency range is between approximately 5 MHz and approximately 42 MHz and the intermediate frequency is between the mobile frequency range and the cable frequency range.

3. The invention of claim 1, wherein, for each cable signal, step (f) comprises the steps of:
   (1) determining a signal level for the cable signal;
   (2) comparing the signal level to a threshold level; and
   (3) combining the cable signal only if the signal level is higher than the threshold level.

4. The invention of claim 3, wherein the wideband mobile frequency range is between approximately 1850 MHz and approximately 1910 MHz and the wideband cable frequency range is between approximately 5 MHz and approximately 42 MHz and the intermediate frequency is between the mobile frequency range and the cable frequency range.

5. A remote converter for processing communications signals, comprising:
   a mobile-to-IF converter adapted to receive, from one or more mobile units, upstream mobile signals in an upstream wideband mobile frequency range and convert the upstream mobile signals into upstream IF signals at an upstream intermediate frequency;
   an IF filter adapted to filter the IF signals;
   an IF-to-cable converter adapted to convert the filtered IF signals to upstream cable signals having any frequency in an upstream wideband cable frequency range;
   a signal level monitor adapted to determine a signal level corresponding to the upstream cable signals; and
   a switch adapted to inhibit transmission of the upstream cable signals to the cable network, if the signal level is not sufficiently high.

6. The invention of claim 5, wherein the signal level monitor comprises:
   a detector adapted to generate the signal level; and
   a comparator adapted to compare the signal level to a threshold level and generate a control signal to control the switch based on the comparison of the signal level to the threshold level.

7. The invention of claim 5, further comprising a cable-to-mobile converter adapted to receive, from the cable network, downstream cable signals in a downstream cable frequency range, convert the downstream cable signals into downstream mobile signals in a downstream mobile frequency range, and transmit the downstream mobile signals to the mobile units.

8. The invention of claim 7, wherein:
   the upstream wideband mobile frequency range is between approximately 1850 MHz and approximately 1910 MHz;
   the upstream wideband cable frequency range is between approximately 5 MHz and approximately 42 MHz;
   the upstream intermediate frequency is between the upstream mobile frequency range and the upstream cable frequency range;
   the downstream cable frequency range is between approximately 54 MHz and approximately 750 MHz; and
   the downstream mobile frequency range is between approximately 1930 MHz and approximately 1990 MHz.

9. The invention of claim 8, wherein the signal level monitor comprises:
   a detector is adapted to generate the signal level; and
   a comparator is adapted to compare the signal level to a threshold level and generate a control signal to control the switch based on the comparison of the signal level to the threshold level.

10. A communications network, comprising:
    a base station converter;
    one or more remote cable nodes; and
    one or more remote converters for each remote cable node, wherein:
      each remote converter is adapted to receive, from one or more mobile units, upstream mobile signals in an upstream wideband mobile frequency range, convert the upstream mobile signals into upstream IF signals at an upstream intermediate frequency; filter the upstream IF signals; convert the filtered upstream IF signals to cable signals in an upstream wideband cable frequency range, and transmit the upstream cable signals to the corresponding remote cable node only if a signal level corresponding to the upstream cable signals is sufficiently high; and
      each remote cable node is adapted to combine the upstream cable signals received from the corresponding remote converters and transmit an upstream combined cable signal to the base station converter; and
      the base station converter is adapted to convert the upstream combined cable signal into an upstream RF signal in the upstream mobile frequency range for transmission to a base station.

11. The invention of claim 10 wherein:

the base station converter is further adapted to receive a downstream RF signal in a downstream mobile frequency range from the base station, convert the downstream RF signal into one or more downstream cable signals in a downstream cable frequency range, and transmit each downstream cable signal to one of the remote cable nodes;

each remote cable node is further adapted to transmit the downstream cable signal to the corresponding remote converters; and each remote converter is further adapted to convert the downstream cable signal into downstream mobile signals in the downstream mobile frequency range, and transmit the downstream mobile signals to the mobile units.

12. The invention of claim 11, wherein:

the upstream wideband mobile frequency range is between approximately 1850 MHz and approximately 1910 MHz;

the upstream wideband cable frequency range is between approximately 5 MHz and approximately 42 MHz;

the upstream intermediate frequency is between the upstream mobile frequency range and the upstream cable frequency range;

the downstream cable frequency range is between approximately 54 MHz and approximately 750 MHz; and the downstream mobile frequency range is between approximately 1930 MHz and approximately 1990 MHz.

* * * * *